United States Patent [19]
Yoshida et al.

[11] Patent Number: 5,734,647
[45] Date of Patent: Mar. 31, 1998

[54] CDMA COMMUNICATION SYSTEM IN WHICH INTERFERENCE REMOVING CAPABILITY IS IMPROVED

[75] Inventors: Shousei Yoshida; Akihisa Ushirokawa, both of Tokyo, Japan

[73] Assignee: NEC, Tokyo, Japan

[21] Appl. No.: 569,362

[22] Filed: Dec. 8, 1995

[30] Foreign Application Priority Data

Dec. 12, 1994 [JP] Japan ................................. 6-307275

[51] Int. Cl.$^6$ ............................................... H04B 7/216
[52] U.S. Cl. ........................... 370/335; 370/342; 375/206
[58] Field of Search .................................. 375/200, 206, 375/208, 210, 261; 370/320, 335, 342, 441

[56] References Cited

U.S. PATENT DOCUMENTS

| | | | |
|---|---|---|---|
| 5,488,629 | 1/1996 | Takahashi et al. | 375/206 |
| 5,488,631 | 1/1996 | Gold et al. | 375/206 |
| 5,544,196 | 8/1996 | Tiedemann, Jr. et al. | 375/206 |
| 5,550,811 | 8/1996 | Kaku et al. | 370/342 |

OTHER PUBLICATIONS

S. Yoshida, et al., "DS/CDMA Adaptive Interference Canceller on Differential Detection for Fast Fading Channel", IEICE paper, B-11, vol. J77-B-II, No. 11, Nov. 1994, pp. 618–627.

S. Sampei, "Rayleigh Fading Compensation Method for 16QAM MODEM in Digital Land Mobile Radio Systems", IEICE paper, B-11, vol. J72-B-II, No. 1, Jan. 1989, pp. 7–15.

*Primary Examiner*—Benedict V. Safourek
*Attorney, Agent, or Firm*—Ostrolenk, Faber, Gerb & Soffen, LLP

[57] ABSTRACT

There is provided a CDMA communication system in which the number of multiple users can be greatly increased under fast fading circumstances. In a transmitting apparatus, an M-ary digital modulator modulates the m-bit ($m \geq 2$ and m is an integer) binary digital signal into M-value symbols ($M=2^m$) prior to the spreading operation by multipliers. In a receiving apparatus, after the despreading operation by an orthogonalizing filter, an M-ary digital demodulator compensates the variation of the phase and amplitude of the carrier of the M-ary modulated signal during the transmission. A decision circuit decides the output of the M-ary digital demodulator. A tap coefficient control circuit calculates orthogonalizing coefficients using the outputs of the subtractors, the outputs of the M-ary digital demodulator, the outputs of receiving filters, and the spreading code. The transmission symbols outputted from the decision circuit are converted into an m-bit signal and then combined into a signal of one sequence.

21 Claims, 6 Drawing Sheets

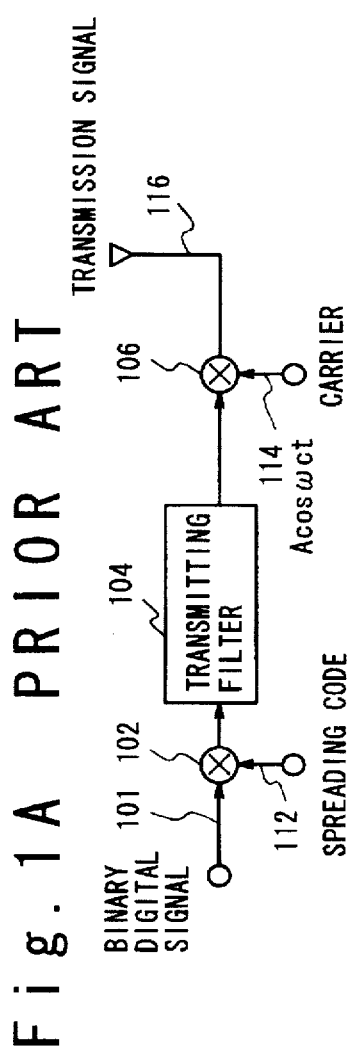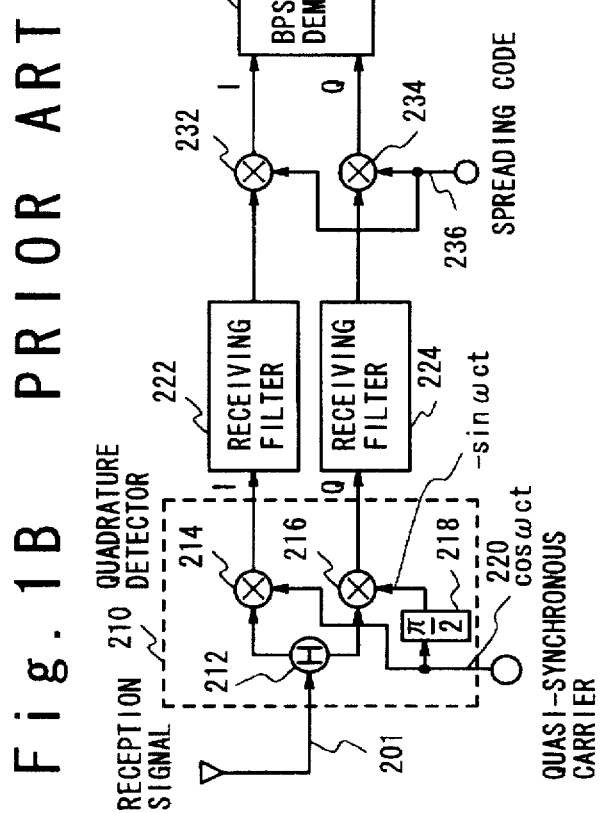

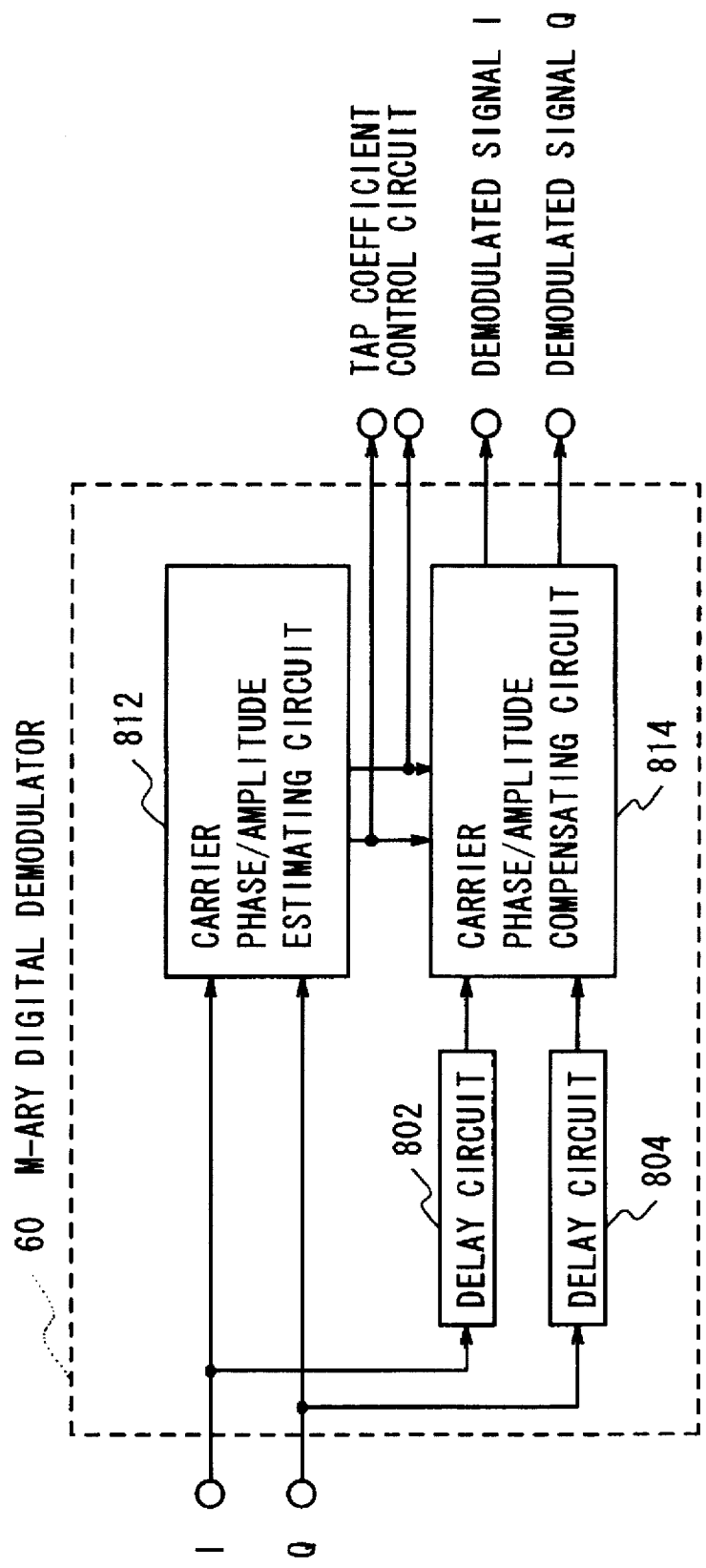

CDMA COMMUNICATION SYSTEM IN WHICH INTERFERENCE REMOVING CAPABILITY IS IMPROVED

BACKGROUND OF THE INVENTION

1. Field of the Invention

The present invention relates to a code division multiple access (CDMA) communication system, and more particularly to a CDMA communication system in which interference removing capability is improved.

2. Description of Related Art

A code division multiple access (CDMA) communication system generally has a possibility in which the number of subscribers can be greatly increased. Therefore, notification is focused on the CDMA communication system as a multiple access system in future mobile communication systems. In the CDMA communication system, in the transmitting apparatus, a user signal is multiplied by a unique spreading code assigned to each user to spread the signal into a wide frequency band and then transmitted on a transmission channel. On the other hand, in the receiving apparatus, the transmission signal from the user is detected through despreading process.

Generally, in mobile communication systems, the transmission signal power of a mobile station is limited to be small and a region where the mobile station can communicate is restricted to a predetermined region which is called a cell. In order to cover a wide area, there are provided a large number of cells. A base station is located at the center of each cell. The mobile station communicates with the base station in a cell where the mobile station belongs. The base station receives the desired signal from the mobile station. In circumstances, the base station also receives interference from other users in the inter-cells in addition to the interference from other users in the intra-cell. Although each interference from other users in the inter-cells is small in power, the number of interference signals is great. A ratio of the inter-cell interference power to the total interference power is not negligibly small. This total amount of interference from other users determines the number of users communicatable at a time. Therefore, in order to increase the number of users communicatable in the CDMA communication system, there are many proposals on interference cancellation techniques.

FIGS. 1A and 1B show an example of a conventional CDMA communication system, in which FIG. 1A is a block diagram of a transmitting apparatus and FIG. 1B is a block diagram of a receiving apparatus. The transmitting apparatus is composed of a multiplier 102, a transmitting filter 104, and a multiplier 106. The multiplier 102 multiplies a binary digital signal 101 as information to be transmitted by a spreading code 112 assigned to each user. The transmitting filter 104 restricts the transmission band of the spread signal. The multiplier 106 2-phase modulates a carrier with the output of the transmitting filter 104 to produce a transmission signal.

The receiving apparatus is composed of a quadrature detector 210 which includes a signal hybrid circuit 212, multipliers 214 and 216, and a phase shifter 218, receiving filters 222 and 224, multipliers 232 and 234, and a BPSK demodulator and a decision circuit 250. The quadrature detector 210 receives a signal composed of signals from a desired user and other users and produce a quadrature signal of I and Q sequences from the received signal with a quasi-synchronous carrier. The receiving filters 222 and 224 restrict the bandwidth of the quadrature signal of I and Q as the outputs of the quadrature detector 210, respectively. The multipliers 232 and 234 receive the outputs of the transmitting filters 222 and 224 to despread with the same spreading code as used in the transmitting apparatus. The BPSK demodulator 240 executes carrier phase synchronization for the output signals of the multipliers 232 and 234 to produce a demodulated signal. The decision circuit 250 detects the sign of the output of the BPSK demodulator 240 to reproduce the binary digital signal transmitted. This example has a basic structure of the conventional CDMA communication system.

FIGS. 2A and 2B shows another example of a conventional CDMA communication system apparatus. A transmitting apparatus of the communication system is composed of multiplier 302, 312, and 314, transmitting filters 322 and 324, and a quadrature modulator which includes multiplier 332 and 334, a phase shifter 336, and a signal combiner 338. The multiplier 302 multiplies an input binary digital signal 341 as information to be transmitted by a spreading code 342 assigned to each user to spread the binary digital signal with spreading code. The multipliers 312 and 314 receive the outputs of the multiplier 302 to multiply the spread signal by the scrambling codes I 344 and Q 346 such that the spread signal is scrambled with two different scrambling codes. Transmitting filters 322 and 324 restrict the band widths of the scrambled signals, respectively. The quadrature modulator 330 modulates a carrier with the filtered signals from the transmitting filters 322 and 324 to produce a transmission signal.

A receiving apparatus is composed of a quadrature detector 410 which includes a signal hybrid circuit 412, a phase shifter 414, and multipliers 416 and 418, receiving filters 422 and 424, multipliers 432, 434, 442 and 444, a BPSK demodulator 450 and a decision circuit 460. The quadrature detector 410 receives a signal in which the transmission signals from other users are multiplexed on the desired user signal transmitted from the transmitting apparatus. The quadrature detector 410 produces a quadrature signal of I and Q from the received signal with a quasi-synchronous carrier 464. The receiving filters 422 and 424 restrict the bandwidth of the quadrature signal from the quadrature detector 410, respectively. The multipliers 432 and 434 receive the outputs of the receiving filters 422 and 424 to multiply the filtered signals by the scrambling codes I 466 and Q 468 such that the filtered signals are descrambled with the same different scramble codes as used on the transmitting apparatus, respectively. The multipliers 442 and 444 receive the outputs of the multipliers 432 and 434 to multiply the descrambled signals by the same spreading code 470 as used in the transmitting apparatus such that the descrambled signals are despread with the spreading code, respectively. The BPSK demodulator 450 executes carrier phase synchronization for the despread signals outputted from the multipliers 442 and 444 to produce a demodulated signal. The decision circuit 460 detects the sign of the demodulated signal outputted from the BPSK demodulator 450 to reproduce the binary digital signal transmitted from the transmitting apparatus.

In the CDMA communication system having the structure shown in FIGS. 2A and 2B, the binary digital signal to be transmitted is first spread and then scrambled by independent I and Q codes. That is, the signal is subjected to the QPSK keying in a chip level so that the transmission signal can be randomizes. Since signals from other user produced in the same signal form, which are multiplexed on the desired user signal on a transmission channel are regarded as noise, the best reception performance can be derived by combining with an adequate error correction scheme in the receiving apparatus. As a result, the number of users who can transmit signals at a time (to be referred as "the number of multiple users" hereinafter) can be increased. In this system, although the transmission signal is regarded as a QPSK signal, the transmission signal can be said to be a BPSK signal from a view point of information bit transmission because the QPSK modulation is not directly performed in a bit level.

The number of multiple users in the above-mentioned conventional CDMA communication systems can be approximated by use of the equation derived in the following way. If a ratio C/I of a desired signal power to a total inference power from the other users in the receiving apparatus can be represented by the following equation (1).

$$C/I = (R \times E_b)/(W \times I_0) \quad (1)$$

where R is a bit rate, W is a bandwidth of the spread signal, $E_b$ is a bit energy, and $I_0$ is an interference power density. In this case, noise added in the receiving apparatus is not considered. Assuming that the interference power from other users are equal to each other in the receiving apparatus, if the number of multiple users is N, the equation I=C(N−1) is satisfied. Therefore, N can be represented by the following equation (2).

$$N = (W/R) \times (1/(E_b/I_0)) + 1 \quad (2)$$

It could be understood from the above equation that the number of multiple users in the conventional CDMA communication system is restricted by an amount of interference from other users and determined based on only the spreading factor (=W/R) and the required $E_b/I_0$ in the receiver. Also, in the conventional CDMA communication system, it is general to perform BPSK modulation for information bits. This is because the spreading factor is not changed even if M-ary modulation (M is an integer equal to or greater than four) is performed in a bit level. As a result of this, the increase of the number of multiple users cannot be expected as long as the required $E_b/I_0$ is not improved. If anything, since the performance of the M-ary modulation generally increases the required $E_b/I_0$, the number of multiple users is decreased.

SUMMARY OF THE INVENTION

Therefore, the present invention has, as an object, to provide a method for CDMA communication and CDMA communication system in which the interfering signal removing capability can be increased so that the number of multiple user stations can be increased.

Another object of the present invention is to provide a method for CDMA communication and CDMA communication system in which interference signals such as signals transmitted from other stations can be removed without requiring information on the transmission of the other stations.

Still another object of the present invention is to provide a method for CDMA communication and CDMA communication system in which a signal is spread with an elongated spreading code while keeping a spreading factor constant, so that the number of multiple users can be increased.

Still further another object of the present invention is a method for CDMA communication and CDMA communication system in which interference signals can be effectively removed under the circumstances of fast fading.

In order to achieve an aspect of the present invention, a CDMA communication system includes a transmitting apparatus and a receiving apparatus.

The transmitting apparatus includes a first transmission section for producing a spread signal from an inputted transmission binary signal using a long spreading code in the same spread bandwidth condition as when the transmission binary signal is directly spread using a spreading code, the code length of the long spreading code being longer than that of the spreading code used when the transmission binary signal is directly spread, and a second transmission section for performing quadrature modulation of a carrier with the spread signal to produce a transmission signal to be transmitted.

The first transmission section desirably includes a section for narrowing a band width of the binary signal prior to the spreading operation, i.e., a section for producing a modulated signal having a bandwidth narrower than that when the binary signal is directly spread, prior to the spreading operation. The above section includes a serial-parallel converter for converting the binary signal in a serial form into an m-bit parallel form (m≧2 and m is an integer), and a M-ary (M=$2^m$) modulating section for performing M-ary digital modulation (M=$2^m$) of at least one of the amplitude and phase with the binary signal in the m-bit parallel form to produce a quadrature signal of two sequences. The first transmission section also includes a section for spreading the transmission quadrature signal from the modulation section with the long spreading code which is longer m times than the code length of the spreading code when the transmission binary signal is directly spread. Thus, the spreading operation can be performed after the binary signal is once narrowed in band. Therefore, the interference signal removing capability can be increased.

The second transmission section includes a filtering section for filtering the spread signal to restrict the bandwidth, and a section for performing quadrature modulation to the bandwidth restricted signal to produce the transmission signal.

The receiving apparatus includes a first reception section for receiving a signal composed of signals from one or more users, including a transmission signal from a desired user, and detecting the transmission signal from the received signal by performing a quadrature detection to produce a reception quadrature signal of two sequences, and a second reception section for performing an orthogonally despreading operation to the reception quadrature signal using the long spreading code as described above, to produce despread signals in which transmission channel variations in the carrier from the desired user are compensated for, and to reproduce the binary signal from the despread signals. The second reception section desirably includes a despreading section for orthogonally despreading the reception quadrature signal using the long spreading code to produce a despread signal. The despreading section includes an orthogonalizing filter for despreading the reception quadrature signal using orthogonalizing coefficients. The orthogonalizing filter is composed of two filters of a transversal filter type which are provided for two sequences of the reception quadrature signal, respectively. The second reception section includes an M-ary demodulation section provided separately from the despreading section, for compensating the despread signals from the despreading section for the transmission channel variation in the carrier from the desired user. The M-ary demodulation section includes a section for estimating the transmission channel variation of the carrier in at least one of phase and amplitude of the carrier, and a section for compensating the despread signals in accordance with the estimation by the estimating section. In this manner, the despreading section and the M-ary demodulation section are separately provided. Thus, the transmission signal can be accurately reproduced even under a fast fading circumstances.

The second reception section further includes a decision circuit for detecting transmission symbols from outputs of the M-ary demodulation section, two switches for selectively outputting one of the outputs of the decision circuit and training signals as decision signals, respectively, two subtractors for determining decision errors from the outputs of the M-ary demodulation section and the decision signals from the switches, a symbol/bit converter for converting the symbols outputted from the decision circuit into an m-bit binary digital signal, and a parallel to serial converter for reproducing the transmission binary signal from the m-bit binary digital signal.

The orthogonalizing coefficients of the orthogonalizing filter are supplied from a tap coefficient control section of the second reception section. The control section calculates the orthogonal coefficients from the decision errors as the outputs of the subtractors, the estimation from the M-ary demodulation section, and the reception quadrature signal using the spreading code to supply to the despreading section.

The CDMA communication system of the present invention is composed of the transmitting apparatus and the receiving apparatus both having the above-mentioned features.

In order to achieve another aspect of the present invention, a communication method in a CDMA communication system comprising the steps of:

producing a spread signal from a transmission binary signal using a long spreading code such that the spread signal has the same bandwidth as when the transmission binary signal is directly spread with a spread code, the code length of the long spreading code being longer than that of the spreading code used when the transmission binary signal is directly spread;

performing quadrature modulation to a carrier with the spread signal;

transmitting the quadrature modulated signal as a transmission signal;

receiving a signal composed of signals from one or more users, including the transmission signal from a desired suer, and detecting the transmission signal from the received signal by performing a quadrature detection to produce a reception quadrature signal of two sequences;

performing an orthogonally despreading operation to the reception quadrature signal using the long spreading code to produce a despread signal in which transmission channel variations of the carrier from the desired user are compensated for; and reproducing the binary signal from the despread signal.

In order to achieve further another aspect of the present invention, a method of transmitting a binary signal in a CDMA communication system comprising the steps of:

producing a spread signal from a transmission binary signal using a long spreading code such that the spread signal has the same bandwidth as when the transmission signal is directly spread using a spread code, the code length of the long spreading code being longer than that of the spreading code used when the transmission binary signal is directly spread;

performing quadrature modulation to a carrier with the spread signal; and transmitting the quadrature modulated signal as a transmission signal.

In order to achieve still another aspect of the present invention, a method of receiving a desired signal in a CDMA communication system comprising the steps of:

receiving a signal composed of signals from one or more users, including the transmission signal from a desired user, and detecting the transmission signal from the received signal by performing a quadrature detecting operation to produce a reception quadrature signal of two sequences;

performing an orthogonally despreading operation to the reception quadrature signal using the long spreading code to produce a despread signal which the transmission channel variations of the carrier from the desired user are compensated for; and reproducing the binary signal from the despread signals.

BRIEF DESCRIPTION OF THE DRAWINGS

FIGS. 1A and 1B are block diagrams of an example of conventional CDMA communication system, wherein FIG. 1A is a block diagram of a transmitting apparatus and FIG. 1B is a block diagram of a receiving apparatus;

FIGS. 2A and 2B are block diagrams of another example of conventional CDMA communication system, wherein FIG. 2A is a block diagram of a transmitting apparatus and FIG. 2B is a block diagram of a receiving apparatus;

FIGS. 3A and 3B are block diagrams of a CDMA communication system relating to the present invention, wherein FIG. 3A is a block diagram of a transmitting apparatus and FIG. 3B is a block diagram of a receiving apparatus;

FIGS. 4A and 4B are block diagrams of a CDMA communication system according to an embodiment of the present invention, wherein FIG. 4A is a block diagram of a transmitting apparatus of the present invention and FIG. 4B is a block diagram of a receiving apparatus of the present invention;

FIG. 6 is a block diagram of an example of M-ary digital demodulator shown in FIG. 4B.

DESCRIPTION OF THE PREFERRED EMBODIMENTS

A CDMA communication system of the present invention will be described below in detail with reference to the accompanying drawings.

First, before the description of the CDMA communication system of the present invention, a CDMA communication system relating to that of the present invention will be described.

Figure 2A:
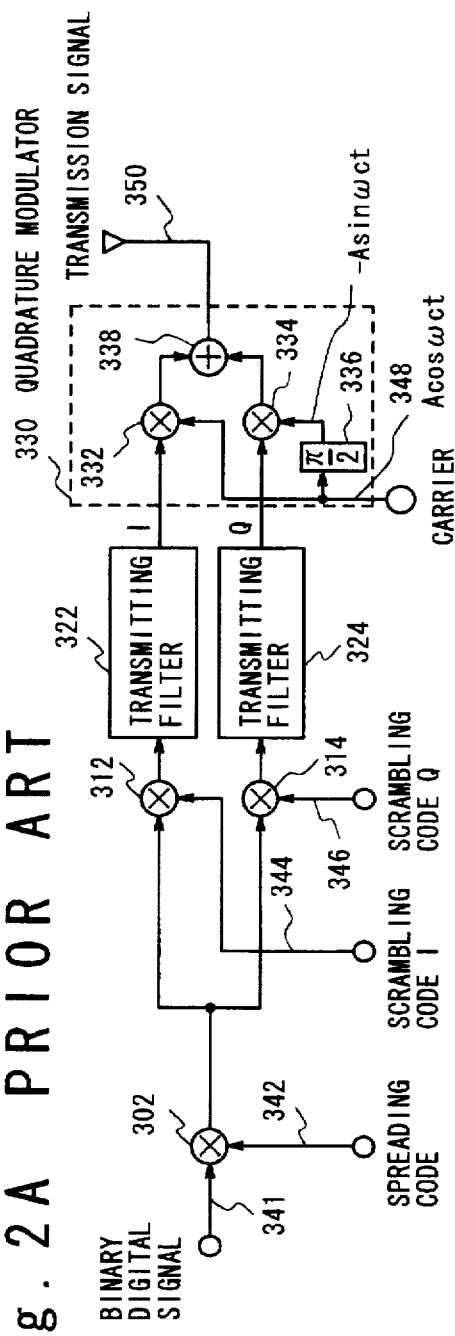
Figure 2B:
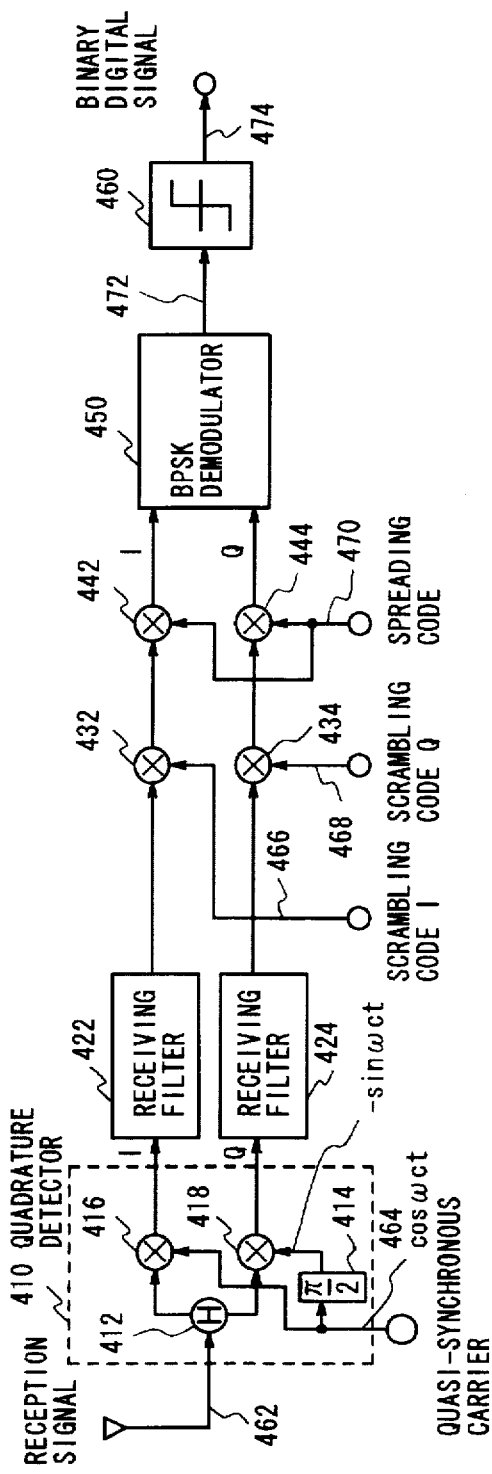
Figure 3A:
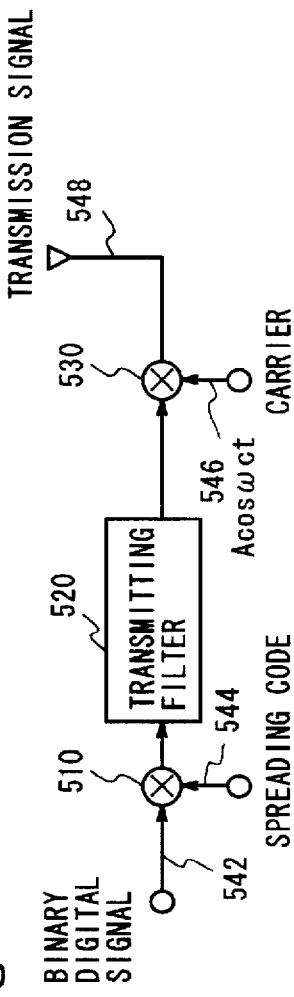
Figure 3B:
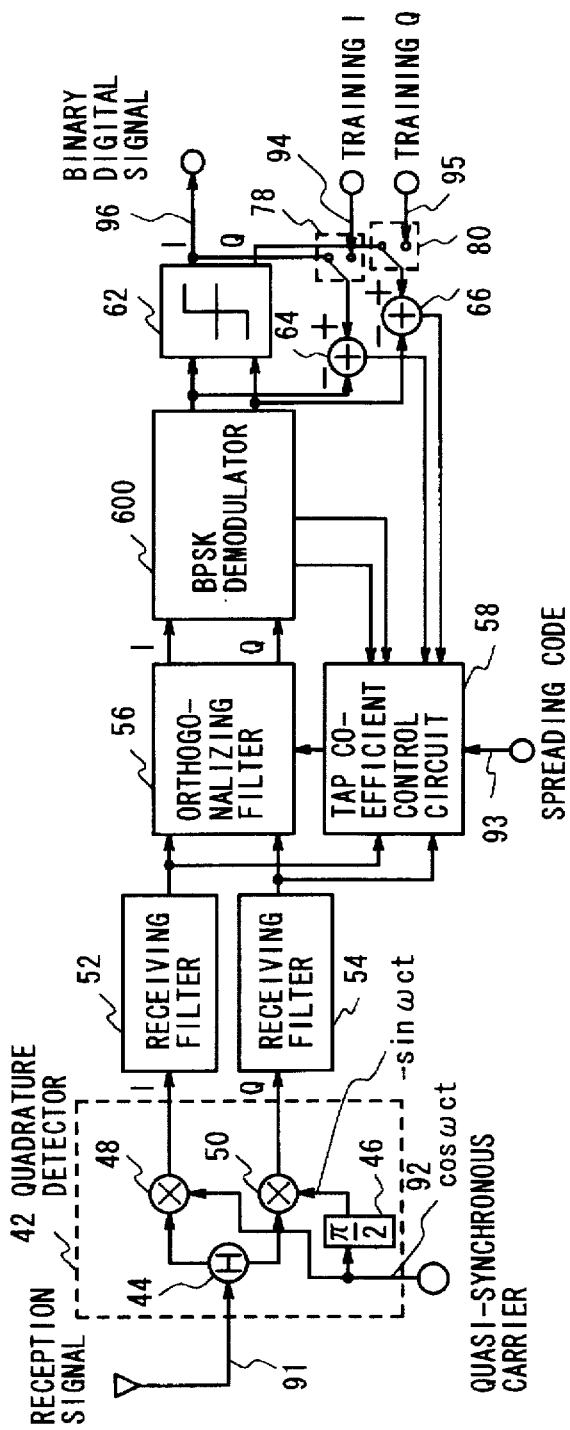

As a system for further increasing the number of multiple users in the CDMA communication system, there are many proposals in which the interference by signals from other users is positively removed in the receiving apparatus. As one of the most promising systems of these proposals, a system using an orthogonalizing filter in the despreading operation has been recently proposed. There is described in "DS/CDMA Adaptive Interference Canceller on Differential Detection for Fast Fading Channel" by Yoshida, Ushirokawa, Yanagi, Hurutani, (IEICE paper, B-II, Vol. J77-B-II, No. 11, November, 1994). FIGS. 3A and 3B shows a CDMA communication system using an orthogonalizing filter, which system relates to the CDMA communication system of the present invention. Here, the structure and operation of a transmitting apparatus is the same as those of the example of FIGS. 1A and 1B.

The receiving apparatus is composed of a quadrature detector 42 which includes a signal hybrid circuit 44, a phase shifter 46, and multipliers 48 and 50, receiving filters 52 and 54, an orthogonalizing filter 56, a tap coefficient control circuit 58, a BPSK demodulator 600, a decision circuit 62, subtractors 64 and 66, and switches 78 and 80. The quadrature detector 42 receives a signal in which transmission signals from other users are multiplexed on the transmission signal from a desired user, and detects a transmission signal of the desired user from the received signal with a quasi-synchronous carrier 92 to produce quadrature signals I and Q of two sequences. The receiving filters 52 and 54 restrict the bandwidth of the quadrature signal I and Q outputted from the quadrature detector 42, respectively. The orthogonalizing filter 56 despreads the filtered signals from the receiving filters 52 and 54 using the same orthogonal coefficients determined adaptively, respectively. The BPSK demodulator 600 inputs the signals outputted from the orthogonalizing filter 56 to performs the compensation for carrier phase shift to the received signals. The decision circuit 62 decides whether the outputs of the BPSK demodulator 600 are respectively higher than threshold values. The switches 78 and 80 switches between the output of the decision circuit 62 and training signals to output as decision signals, respectively. Generally, convergence is performed using the training signal as the decision signals upon an initial stage of reception. Then, after the convergence, the switches 78 and 80 are switched so that the outputs from the decision circuit 62 are used as the decision signals. The subtractors 64 and 66 extract decision errors from the decision signals and the outputs of the BPSK demodulator 600. The tap coefficient control circuit 58 calculates orthogonal coefficients from the decision errors as the outputs of the subtractors 64 and 66, the reproduced carrier signals outputted from the BPSK demodulator 611, the outputs of the receiving filters 52 and 54, using the same spreading code as multiplied in the transmitting apparatus. One of the outputs from the decision circuit 62 is the binary digital signal transmitted from the transmitting apparatus.

Here, the orthogonalizing filter 56 performs a despreading operation using adaptively determined orthogonal coefficients in place of the despreading operation using the spreading code which is used in the transmitting apparatus, which operation is ordinarily executed as shown in FIG. 1B.

Figure 5:
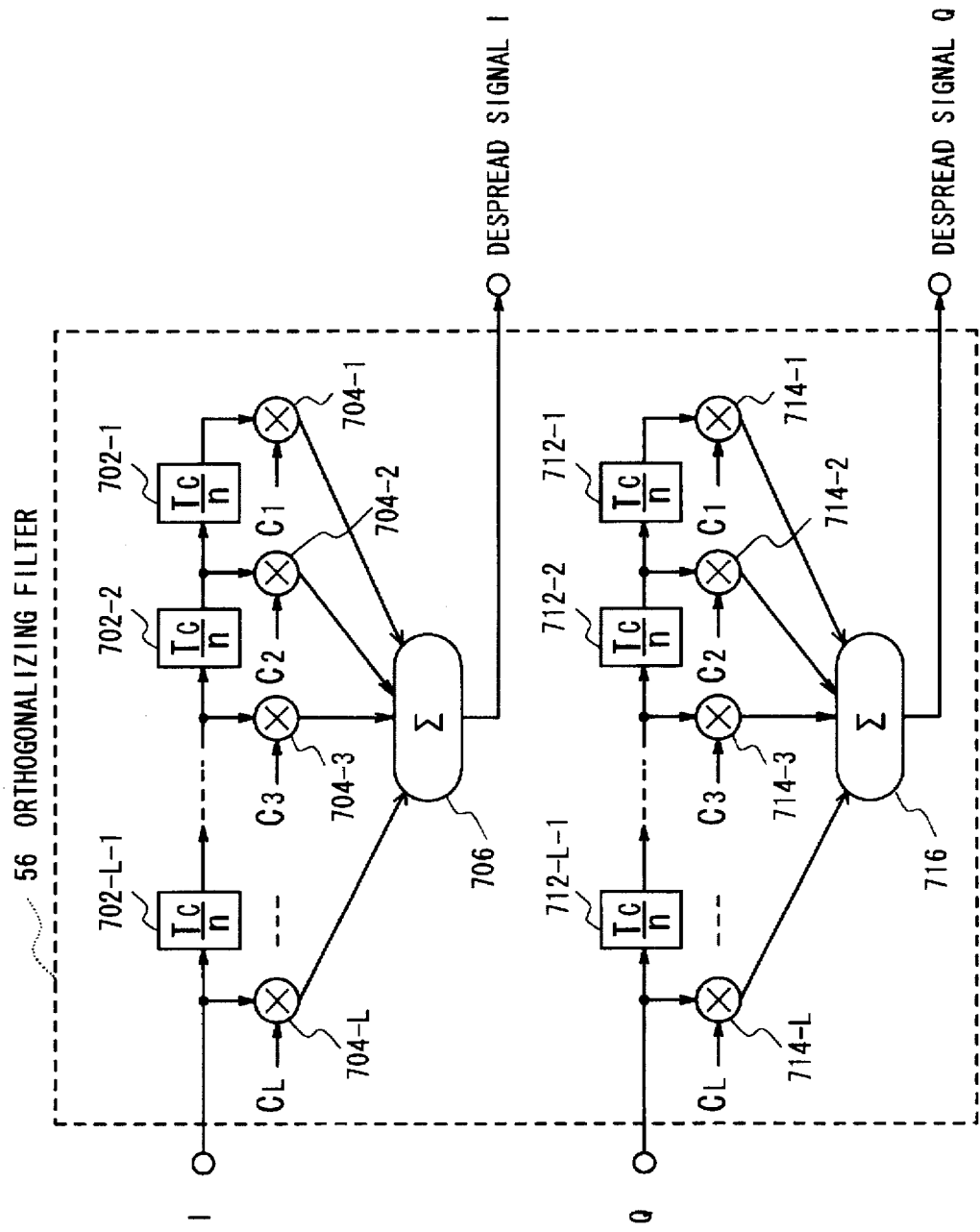
FIG. 5 is a block diagram of an example of orthogonalizing filter shown in FIGS. 3B and 4B.

FIG. 5 shows an example of orthogonalizing filter 56. The orthogonalizing filter 56 shown in this figure is composed of two independent filters of a transversal type. The respective filters input the quadrature signals I and Q of two sequences filtered by the receiving filters 52 and 54, respectively. Each of the input signals is delayed by a time period determined based on each of fractional chip delay elements 702-1, 702-2 ... 702-L-1 or 712-1, 712-2 ... 712-L-1 provided for a predetermined number. Multipliers 704-1, 704-2 .. 704-L or 714-1, 714-2 ... 714-L multiply the corresponding delayed signal by corresponding tap coefficients $C_1, C_2 \ldots C_L$, respectively. Adders 233 and 243 add the outputs of the multipliers 704-1, 704-2 ... , 704-L and 714-1, 714-2 ... 714-L to produce despread signals I and Q. In the orthogonalizing filter 56, the same orthogonalizing coefficients are used for two filters of transversal type and supplied from the tap coefficient control circuit 58.

The receiving apparatus shown in FIG. 3B has the feature in that information on the other user stations such as spreading codes, reception timings, and transmission path parameters is not completely required in the process of removal of interference signals transmitted from the other users. Also, by separately providing the synchronizing function of carrier phases from the despreading function by the orthogonalizing filter 56, the interference signals transmitted from the other user stations can be effectively removed under the circumstances under which fast fading is caused which is a problem in a mobile communication system.

More detailed description of the CDMA communication system shown in FIGS. 3A and 3B is provided in the pending U.S. patent application Ser. No. 08/272,689 entitled "DS/CDMA Receiver for High-Speed Fading Environment", filed on Jul. 8, 1994 by Akihisa USHIROKAWA and Shousei YOSHIDA who are the same inventors as those of this patent application, and which is assigned to the same assignee as in this patent application. The description of the above-described patent application is incorporated herein by reference.

In the CDMA communication system having the above-mentioned structure, assuming that the powers of received signals from all the user stations are equal to each other, the number of multiple user stations can be approximated by the following equation (3).

$$N=(W/R)\times(1/(E_b/I_0))+N_c+1 \quad (3)$$

where $N_c$ is the number of interfere signals from other users which can be removed in the receiving apparatus. From the above equation (3), as $N_c$ becomes great, the number of multiple users becomes also great. In the receiving apparatus of the CDMA communication system shown in FIG. 3B, although power-dominant interfere signals from other users can be removed adaptively, there is a limit in the interference removing capability or the number of interference signals $N_c$ which can be removed. Particularly, in the cellular communication systems, the number of interference signals can be large compared to the Nc value, because a number of inter-cell interferences exist in addition to intra-cell interference signals. Therefore, all the interference signals can not be removed. In the receiving apparatus shown in FIG. 3B, the limit of the number of removable interference signals depends upon the spreading code length.

Figure 4A:
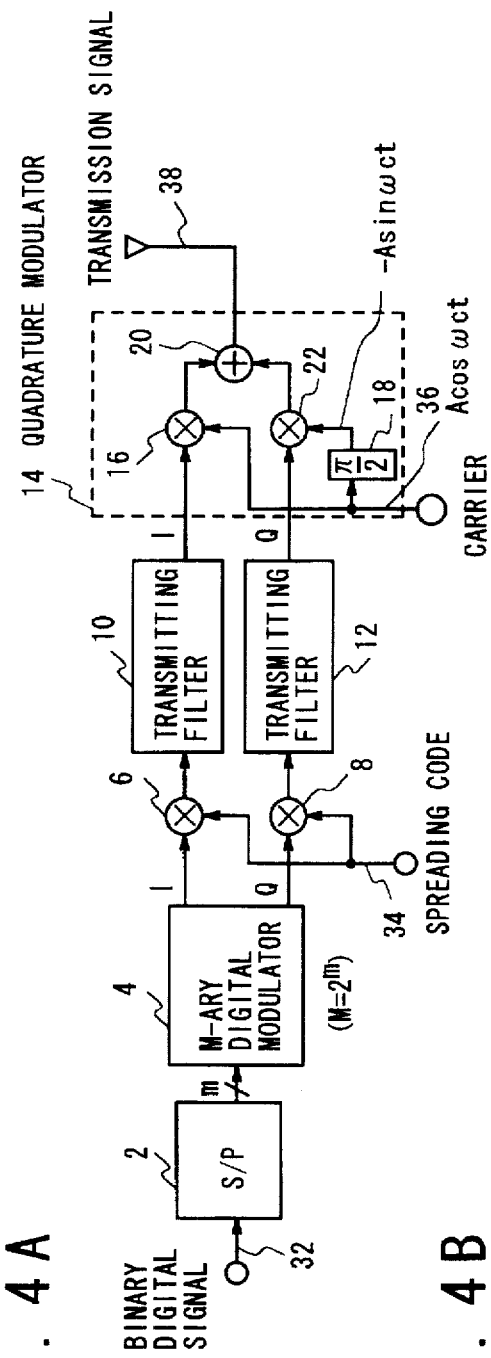
Figure 4B:
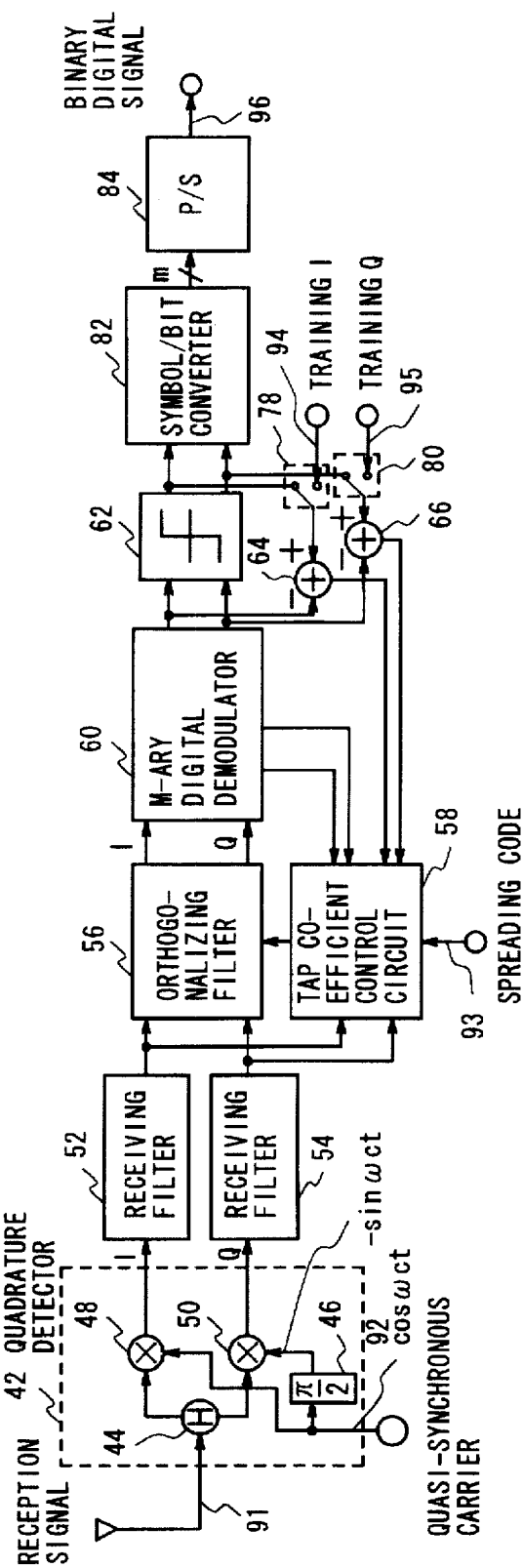

Next, the CDMA communication system of the present invention will be described with reference to the accompanying drawings. FIGS. 4A and 4B illustrate the CDMA communication system according to an embodiment of the present invention, which includes a transmitting apparatus shown in FIG. 4A and a receiving apparatus shown in FIG. 4B. The components shown in FIGS. 4A and 4B having the same structure or function as shown in FIGS. 3A and 3B are assigned with the same reference numerals and the detailed description of them will be omitted.

Referring to FIG. 4A, the transmitting apparatus is composed of a serial - parallel converter 2, an M-ary digital modulator 4, multipliers 6 and 8, transmitting filters 10 and 12, and a quadrature modulator 14 which includes multipliers 16 and 22, a phase shifter 18, and a signal combiner 20. The serial to parallel converter 2 converts a sequence of binary digital signal 32 from a serial form into a m-bit ($m \geq 2$ and m is an integer, m=2 for example) parallel form so as to divide into signals of m sequences. The M-ary digital modulator 4 modulates the m-bit binary digital signal into M-value symbols ($M=2^m$) to produce quadrature signals I and Q of two sequences. Thereby, the band width of the quadrature signals I and Q is narrowed compared to the band width required when the binary digital signal 32 is transmitted without the narrowing as it is. The multipliers 6 and 8 multiply the quadrature signals I and Q outputted from the M-ary digital modulator 4 by an elongated spreading code to spread the quadrature signals I and Q. The elongated spreading code has a code length longer than the spreading code length used in the transmitting apparatus shown in FIG. 1A in which the binary digital signal is spread without any narrowing. The code length of the elongated spreading code is concerned with the narrowing by the converter 2 and M-ary digital modulator 4 as well as the transmission band width. The transmitting filters 10 and 12 perform the restriction of band widths to the outputs of the multipliers 6 and 8, respectively. The quadrature modulator 14 modulates a carrier 36 with the outputs of the transmitting filters 10 and 12 to produce a transmission signal 38. More particularly, the carrier 18 is shifted in phase by π/2 by the phase shifter 18. The multiplier 16 multiplies the carrier 36 by the output of the transmitting filter 10. The multiplier 22 multiplies the carrier 36 shifted in phase by the phase shifter 18 by the output of the transmitting filter 12. The signal combiner 20 adds the outputs of the multipliers 16 and 22 to produce the transmission signal.

The receiving apparatus is composed of a quadrature detector 221 which includes a signal hybrid circuit 46, a phase shifter 46, and multipliers 48 and 50, receiving filters 52 and 54, an orthogonalizing filter 56, a tap coefficient control circuit 58, an M-ary digital demodulator 60, a decision circuit 62, a symbol to bit converter 82, and a parallel to serial converter 84. The quadrature detector 42 receives the transmission signal from the transmitting apparatus as a reception signal 91. In the reception signal 91, transmission signal from other user stations are multiple on the transmission signal 38 from the specific user station. The quadrature detector 42 detects the transmission signal from the reception signal 91 by use of a quasi-synchronous carrier 92 to produce quadrature signals I and Q of two sequences. More particularly, in the quadrature detector 42, the signal hybrid circuit 44 delivers the reception signal to the multipliers 48 and 50. The quasi-synchronous carrier 92 is shifted in phase by π/2 by the phase shifter 46. The multiplier 48 multiplies the quasi-synchronous carrier 92 by the output of the signal hybrid circuit 44. The multiplier 50 multiplies the quasi-synchronous carrier 92 shifted in phase by the phase shifter 46 by the output of the signal hybrid circuit 44. The receiving filters 52 and 54 perform the restriction of band widths to the outputs of the quadrature detector 42, i.e., the multipliers 48 and 50, respectively. The orthogonalizing filter 56 despreads the outputs of the receiving filters 205 and 206 with orthogonalizing coefficients adaptively determined the tap coefficient control circuit 58. The M-ary digital demodulator 60 receives the outputs of the orthogonalizing filter 56 to performs the compensation for the variation of the phase and amplitude of the carrier. The decision circuit 62 decides the output of the M-ary digital demodulator 60. The switch 78 switches between the output of the decision circuit 62 and a training signal I 94 to output as a decision signal. Also, the switch 80 switches between the other output of the decision circuit 62 and a training signal Q 95 to output as a decision signal. Generally, convergence is performed using the training signals I 94 and Q 95 in the initial stage of signal reception. After the convergence, the switches 78 and 80 are switched to allow the outputs from the decision circuit 62 to be used. The subtractors 64 and 66 extract decision errors from the outputs of the M-ary digital demodulator 60 and the decision signals from the switches 78 and 80. The tap coefficient control circuit 58 calculates orthogonalizing coefficients from the decision errors as the outputs of the subtractors 64 and 66, the reproduced carrier signals from the M-ary digital demodulator 60, the outputs of receiving filters 52 and 54, using the same spreading code 93 as used in the transmitting apparatus. The spreading code 93 is used as the initial tap coefficients of the orthogonalizing filter 56. Since the training signals I and Q are used in the initial stage of signal reception, the tap coefficient control circuit 58 adaptively determines the orthogonalizing coefficients which is supplied to the orthogonalizing filter 56, as described above. The symbol/bit converter 82 converts the symbols outputted from the decision circuit 62 into an m-bit binary digital signal. The serial/parallel converter 84 combines the m-bit binary digital signal into a signal of one sequence to reproduce the binary digital signal transmitted from the specific user station.

The orthogonalizing filter 56 is the same as described in the above example referring to FIGS. 3B and 5. Therefore, the description of the filter 56 is omitted. As an example of the tap coefficient control circuit 58, an adaptive control method would be considered based on minimum mean squared error (MMSE) criterion. As a method of realizing the MMSE, the least mean square (LMS) algorithm is widely used. Assuming that the output quadrature signal of the orthogonalizing filter 56 is y(i), the decision signal from the switch 78 and 80 in the complex form is d(i), and the reproduced carrier signal from the M-ary digital demodulator 60 is x(i), an error signal e(i) can be expressed by the following equation (4).

$$e(i)=d(i)-y(i)\{x^*(i)/|x(i)|^2\} \quad (4)$$

where * represents complex conjugate. In the above equation, the second term of the right side indicates the carrier amplitude and phase compensating operation in the M-ary digital demodulator 60. Further, assuming that an input signal vector of the orthogonalizing filter 56 is r(i) and the tap coefficients of the orthogonalizing filter 56 are c(i), the output signal y(i) of the orthogonalizing filter 56 is expressed by the following equation (5).

$$y(i)=c^T(i)r(i) \quad (5)$$

Therefore, the tap coefficient c(i+1) of the orthogonalizing filter 56 is updated in accordance with the following equation (6).

$$c(i+1)=c(i)+Re[\mu r(i)(x(i)/|x(i)|e^*(i)] \quad (6)$$

where * is a step size in the LMS. Re[a] indicates the operation for obtaining the real part of a complex value a. In this update equation, only the carrier phase information x(i)/|x(i)| from the M-ary digital demodulator 60 is used.

Various demodulation schemes could be considered by a person skilled in the art as the scheme used in the M-ary digital demodulator 60. These schemes are greatly dependent upon the demodulation method to be used. For instance, in a case of using phase shift keying (PSK), not only a coherent detection can be applied but also the differential detection whose structure is simple. In a case of using amplitude and phase shift keying (APSK) or quadrature amplitude modulation (QAM), the differential detection can not be applied. Further, there are many types of scheme as the coherent detection scheme. FIG. 6 illustrates an embodiment of the M-ary digital demodulator 60 which uses the synchronous detecting system. The M-ary digital demodulator 60 inputs the quadrature signals of two sequences as the output of the orthogonalizing filter 56. The carrier phase/amplitude estimating circuit 812 estimates the influence of the variation of the phase and amplitude of the carrier in the transmission channel in the M-ary modulation signal. Such a carrier phase/amplitude estimating circuit 812 is described in, for example, "Rayleigh Fading Compensation Method for 16QAM MODEM in Digital Land Mobile Radio Systems" by S. Sampei (paper in IEICE, B-II, Vol. J72-B-II, January, 1989). In this system, known pilot symbols are periodically inserted in the data sequence and the phase and amplitude of carrier in the pilot section are first estimated using these pilot symbols. The carrier determined by the interpolation with the carrier in the pilot section is used for the demodulation in the data section. If the system is used, the coherent demodulation can be effectively performed under the fading circumstance in which the phase and amplitude of the carrier vary fast. The delay circuits 802 and 804 delay the input signals until the estimation of the variation of the phase and amplitude of the carrier is completed in the carrier phase/amplitude estimating circuit 812. The carrier phase/amplitude compensating circuit 814 compensates the outputs of the orthogonalizing filter 56 for the variation of the phase and amplitude of the carrier using the phase and amplitude estimated by the carrier phase/amplitude estimating circuit 812. Generally, the carrier phase/amplitude compensating circuit 814 is realized to multiply the signals outputted from the orthogonalizing filter 56 by the inverse characteristic of the estimated complex carrier. The operation was already described in the equation indicative of the error signal e(i).

As described above, in the CDMA communication system according to the present invention shown in FIGS. 4A and 4B, a signal to be transmitted is once converted into a narrow band signal by the M-ary digital modulator 4 by executing the M-ary modulation ($M \geq 2^m$ or 4, for example and M is an integer) to m-bit information. Then, the spreading operation is executed. Therefore, the spreading code length can be made m times ($m = \log_2 M$) under the same spreading factor ($= W/R$), compared to the code length of the spreading code with which the signal is spread without converting into the narrow band signal. In this manner, the interference removable capability, i.e., the number of removable interference signals by the orthogonalizing filter 56 can be increased about m times in the receiving apparatus shown in FIG. 4B. Further, by providing the M-ary digital demodulator 60 for compensating the M-ary modulation signal for the variation of the phase and amplitude of the carrier independently from the orthogonalizing filter 56 in the receiving apparatus, the separation between the function of orthogonalization of code, i.e., the despreading function, and demodulating function of M-ary modulation signal can be made possible, so that the tracking capability for fast varying fading in the transmission channel can be obtained.

According to the CDMA communication system of the present invention, the spreading code length can be made long while keeping the spreading factor constant, by executing Mary modulation for information bits prior to the spreading in the transmitting apparatus. Thereby, the interfering signal removing capability or the number of removable interfering signals by the orthogonalizing filter in the receiving apparatus can be increased. Further, in the receiving apparatus, since the compensation the multiple value modulation signal for the variation of the phase and amplitude of the carrier in the M-ary modulated signal is performed independently from the despreading operation of the orthogonalizing filter, the orthogonalizing function of code and the demodulating function of the M-ary modulation signal can be separated from each other, so that the tracking capability for the fast fading in the transmission channel can be obtained.

What is claimed is:

1. A CDMA communication system comprising:
   a transmitting apparatus which comprises:
   a first transmission means for converting an inputted transmission binary signal into a parallel form, and for producing a spread signal from the parallel transmission binary signal using a spreading code; and
   second transmission means for performing quadrature modulation of a carrier with said spread signal to produce a desired transmission signal which is multiplexed with other transmission signals to produce a multiplexed signal, and
   a receiving apparatus which comprises:
   first reception means for receiving the multiplexed signal, and detecting said desired transmission signal from the received signal by performing a quadrature detecting operation to produce a reception quadrature signal of two sequences; and
   second reception means for performing a despreading operation to the reception quadrature signal using said spreading code so as to remove influence of the other transmission signals, for producing a despread signal and for demodulating the spread signal to reproduce said binary signal from the despread signal.

2. A CDMA communication system comprising:
   a transmitting apparatus which comprises:
   a serial-parallel converter for converting a binary signal in a serial form into an m-bit parallel form ($m \geq 2$ and m is an integer); and
   M-ary modulating means for performing an M-ary digital modulation ($M = 2^M$) of at least one of amplitude and phase of carrier with said binary signal in the m-bit parallel form to produce a transmission quadrature signal of two sequences;
   spreading means for producing a spread signal from said transmission quadrature signal of two sequences using a spreading code; and
   transmission quadrature means for performing quadrature modulation of the carrier with said spread signal to produce a transmission signal, and
   a receiving apparatus which comprises:
   first reception means for receiving a signal composed of signals from one or more users, including said transmission signal from a desired user, and detecting said transmission signal from the received signal by performing a quadrature detecting operation to produce a reception quadrature signal of two sequences; and
   second reception means for performing a despreading operation to the reception quadrature signal using said spreading code to produce a despread signal in which a transmission channel variation of the carrier from the desired user is compensated for and to reproduce said binary signal from the despread signal.

3. A CDMA communication system according to claim 2, wherein said transmission quadrature means includes:
   filtering means for filtering the spread signal to restrict a bandwidth; and
   means for performing quadrature modulation to the bandwidth restricted signals to produce the transmission signal.

4. A CDMA communication system according to claim 2, wherein said second reception means includes despreading means for orthogonally despreading the reception quadrature signal using said spreading code to produce the despread signal.

5. A CDMA communication system according to claim 4, wherein said despreading means includes an orthogonalizing filter for despreading the reception quadrature signals using orthogonalizing coefficients.

6. A CDMA communication system according to claim 5, said orthogonalizing filter includes two filters of a transversal filter type which are provided for the two sequences of reception quadrature signal, respectively.

7. A CDMA communication system according to claim 4, wherein said second reception means includes M-ary demodulation means provided separately from said despreading means, for compensating the despread signals from said despreading means for the variation of the carrier in at least one of amplitude and phase during the transmission.

8. A CDMA communication system according to claim 7, wherein said M-ary demodulation means includes means for estimating the variation of at least one of phase and amplitude of the carrier during the transmission, and means for compensating the despread signal in accordance with the estimation by said estimating means.

9. A CDMA communication system according to claim 8, wherein said second reception means further includes:
   a decision circuit for detecting transmission symbols from outputs of said M-ary demodulation means;
   two switches for selectively outputting one of the outputs of said decision circuit and training signals as decision signals, respectively;
   two subtractors for determining decision errors from the outputs of said M-ary demodulation means and the decision signals from said switches;
   a symbol/bit converter for converting the symbols outputted from said decision circuit into an m-bit binary digital signal; and
   a parallel to serial converter for reproducing said transmission binary signal from the m-bit binary digital signal.

10. A CDMA communication system according to claim 9, wherein said despreading means includes an orthogonalizing filter having two filters of a transversal filter type, for despreading the reception quadrature signal of two sequences using orthogonalizing coefficients, and
   wherein said second reception means further includes tap coefficient control means for calculating said orthogonalizing coefficients from the decision errors as the outputs of said subtractors, the estimation from said M-ary demodulation means, and the reception quadrature signal, using said spreading code to supply to said despreading means.

11. A transmitting apparatus in a CDMA communication system comprising:
   a serial-parallel converter for converting said binary signal in a serial form into an m-bit parallel form (m≧?2 and m is an integer); and
   M-ary modulating means for performing an M-ary digital modulation (M=2m) of at least one of amplitude and phase with said binary signal in the m-bit parallel form to produce a transmission quadrature signal of two sequences;
   spreading means for producing a spread signal from said transmission quadrature signal of two sequences using a spreading code; and
   transmission quadrature means for performing quadrature modulation of the carrier with said spread signal to produce a transmission signal.

12. A transmitting apparatus in a CDMA communication system according to claim 11, wherein said transmission quadrature means includes:
   filtering means for filtering the spread signal to restrict the bandwidth; and
   means for performing quadrature modulation to the bandwidth restricted signal to produce the transmission signal.

13. A receiving apparatus in a CDMA communication system comprising:
   a first reception means for receiving a signal composed of signals from one or more users, including a transmission signal from a desired user, and detecting said transmission signal from the received signal by performing a quadrature detecting operation with a quasi-synchronous carrier to produce reception quadrature signal of two sequences;
   despreading means for performing a despreading operation to the reception quadrature signal using a spreading code such that the signals from the other user which are multiplexed together with the transmission signal from the desired user are removed and for producing a despread signal;
   demodulating means for demodulating the despread signal to produce a demodulated signal;
   deciding means for deciding transmission symbols from the demodulating signal; and
   control means for controlling said despreading means in accordance with the reception quadrature signal, a reproduced carrier signal from said demodulating means, decision errors from said deciding means, and a spreading code which is used to obtain the transmission signal from the desired user.

14. A receiving apparatus in a CDMA communication system according to claim 13, wherein said despreading means includes an orthogonalizing filter for despreading the reception quadrature signal using orthogonalizing coefficients from said control means.

15. A receiving apparatus in a CDMA communication system according to claim 14, said orthogonalizing filter includes two filters of a transversal filter type which are provided for the two sequences of reception quadrature signal, respectively.

16. A receiving apparatus in a CDMA communication system according to claim 13, wherein said demodulating means includes M-ary demodulation means provided separately from said despreading means, for compensating the despread signal from said despreading means for the variation of the carrier during the transmission.

17. A receiving apparatus in a CDMA communication system according to claim 16, wherein said M-ary demodulation means includes means for estimating the variation of at least one of phase and amplitude of the carrier during the transmission, and means for compensating the despread signal in accordance with the estimation by said estimating means.

18. A receiving apparatus in a CDMA communication system according to claim 16, wherein said despreading means includes an orthogonalizing filter having two filters of a transversal filter type, for despreading the reception quadrature signal using orthogonalizing coefficients from said control means, and
   wherein said second reception means further includes tap coefficient control means for calculating said orthogonalizing coefficients from the decision errors as the outputs of said subtractors, the estimation from said M-ary demodulation means, and the reception quadrature signal, using said long spreading code to supply to said despreading means.

19. A receiving apparatus in a CDMA communication system according to claim 13, wherein said deciding means includes two subtractors for determining the decision errors from the outputs of said demodulating means and the transmission symbols of said deciding means as decision signals.

20. A receiving apparatus in a CDMA communication system according to claim 19, said deciding means further comprising switch means for selectively outputting one of the transmission symbols and training signals as the decision signals to said two subtractors.

21. A receiving apparatus in a CDMA communication system according to claim 13, further comprising:

a symbol/bit converter for converting the symbols outputted from said decision circuit into an m-bit binary digital signal; and a parallel to serial converter for reproducing said transmission binary signal from the m-bit binary digital signal.

* * * * *